(12) United States Patent
Zanelato et al.

(10) Patent No.: US 9,184,678 B2
(45) Date of Patent: Nov. 10, 2015

(54) METHOD FOR STARTING A SINGLE-PHASE INDUCTION MOTOR, STARTING DEVICE FOR A SINGLE-PHASE MOTOR AND STARTING SYSTEM THEREFOR

(75) Inventors: Marcelo Zanelato, Joinville SC (BR); Claudio Bruning, Joinville SC (BR); Marcos Roberto De Souza, Joinville SC (BR)

(73) Assignee: Whirlpool S.A., Sao Paulo (BR)

(*) Notice: Subject to any disclaimer, the term of this patent is extended or adjusted under 35 U.S.C. 154(b) by 218 days.

(21) Appl. No.: 14/002,040

(22) PCT Filed: Mar. 1, 2012

(86) PCT No.: PCT/BR2012/000052
§ 371 (c)(1),
(2), (4) Date: Jan. 9, 2014

(87) PCT Pub. No.: WO2012/116425
PCT Pub. Date: Sep. 7, 2012

(65) Prior Publication Data
US 2014/0132199 A1    May 15, 2014

(30) Foreign Application Priority Data
Mar. 1, 2011    (BR) ..................................... 1101069

(51) Int. Cl.
*H02P 1/44* (2006.01)
*H02P 1/42* (2006.01)
*H02P 25/04* (2006.01)

(52) U.S. Cl.
CPC .. *H02P 1/44* (2013.01); *H02P 1/42* (2013.01); *H02P 25/04* (2013.01)

(58) Field of Classification Search
CPC .............. H02P 1/42; H02P 1/44; H02P 25/04
USPC .......... 318/785, 786, 787, 789, 793, 797, 790
See application file for complete search history.

(56) References Cited

U.S. PATENT DOCUMENTS 5,051,681 A    9/1991   Schwarz
5,053,908 A    10/1991  Cooper et al.
(Continued)

FOREIGN PATENT DOCUMENTS

WO    WO 02/09264      1/2002
WO    WO 2004/038906   5/2004

OTHER PUBLICATIONS

International Search Report mailed Oct. 15, 2012 for International application No. PCT/BR2012/000052.
(Continued)

*Primary Examiner* — Rita Leykin
(74) *Attorney, Agent, or Firm* — Fay Sharpe LLP

(57) ABSTRACT

The present invention relates to a starting device for a single-phase induction motor, comprising a stator (M) with an running winding (B1) and a starting winding (B2), a starting device (28) connecting the starting winding (B2) to a source (F) of alternate voltage supply, when in a closed state, the start switch (S1) being carried to an open position when the start of the motor is ended, the starting device (28) comprising: a start switch (S1), an electronic signal-processing device (30) receiving current signals originating from a current sensor (RS) flowing through the start switch (S1) and receiving voltage signals from a current zero-crossing sensor SV, wherein the control unit (30) instructs the closing and opening of the start switch (S1) in accordance with the interpretation of the signals by voltage and current zero-crossing sensors, and time sensors.

21 Claims, 3 Drawing Sheets

(56) References Cited

U.S. PATENT DOCUMENTS

| | | | |
|---|---|---|---|
| 5,280,227 A * | 1/1994 | Bashark | 318/751 |
| 5,650,697 A * | 7/1997 | Imagi et al. | 318/400.3 |
| 6,160,372 A * | 12/2000 | Cusack | 318/786 |
| 6,208,113 B1 * | 3/2001 | Lelkes et al. | 318/807 |
| 6,756,756 B1 | 6/2004 | Chmiel et al. | |
| 7,202,627 B1 | 4/2007 | Min | |
| 7,489,484 B2 * | 2/2009 | Keener | 361/28 |
| 7,501,785 B2 * | 3/2009 | Schwarz | 318/778 |
| 7,821,222 B2 * | 10/2010 | Borsting et al. | 318/778 |
| 8,198,854 B2 * | 6/2012 | Zhao | 318/786 |
| 2006/0175999 A1 | 8/2006 | Min | |

OTHER PUBLICATIONS

Written Opinion mailed Oct. 15, 2012 for International application No. PCT/BR2012/000052.

International Preliminary Report on Patentability mailed Jul. 4, 2013 for International application No. PCT/BR2012/000052.

* cited by examiner

METHOD FOR STARTING A SINGLE-PHASE INDUCTION MOTOR, STARTING DEVICE FOR A SINGLE-PHASE MOTOR AND STARTING SYSTEM THEREFOR

CROSS-REFERENCE TO RELATED APPLICATIONS

This application is the U.S. National Phase filing of International Application No. PCT/BR2012/000052 filed Mar. 1, 2012, which claims priority from and the benefit of the filing date of Brazilian patent application No. PI1101069-0, filed Mar. 1, 2011, the disclosures of each of said applications are hereby incorporated by reference in their entirety.

The present invention relates to a method of starting a single phase induction motor specially designed to optimize the starting time of said motor depending on its size and operating load.

The present invention further relates to an electronic starting device of the type used in electric motors, particularly in single-phase induction motors.

Additionally, the present invention relates to a system for starting single phase induction motors which includes the device and method proposed herein.

DESCRIPTION OF THE PRIOR ART

Single-phase induction motors are widely used due to their simplicity, robustness and high performance. Their application is found in household appliances in general, refrigerators, freezers, air conditioners, hermetic compressors, washing machines, motor pumps, fans and some industrial applications.

Known induction motors generally consist of a cage rotor and a wound stator comprised of two windings, one of them a running winding and the other a starting winding. During normal operation of the compressor, the running winding is fed by alternating current, and the starting winding is fed temporarily, at the beginning of the starting operation, creating a rotating magnetic field in the stator air gap, a condition necessary to accelerate the rotor and bring about its start.

The rotating magnetic field can be obtained by supplying the starting winding with a current lagging in time relative to the circulating current through the primary winding, preferably at an angle close to 90 degrees. This discrepancy between the current flowing in both windings is achieved by constructive characteristics of the windings or by installing external impedance in series with one of the windings, although typically in series with the starting winding. The value of the circulating current through the starting winding during the starting process of the motor is normally high, making it necessary to use some type of switch that would interrupt this current after the time required to bring about the motor's acceleration has passed.

For motors in which very high efficiency is required, the starting winding is not fully switched off after the expiration of the starting period, as a capacitor called the operating capacitor remains in series with this winding, providing sufficient current to increase the maximum torque of the motor and its efficiency.

For motors with this configuration using a permanent impedance in series with the starting winding during normal motor operation, several PTC-type starting devices are known, electromechanical relay, timed, as well as combinations in which a PTC connected in series with a device which interrupts the flow of current after a determined period of time (RSP) as cited in U.S. Pat. No. 5,053,908 and U.S. Pat. No. 5,051,681, and in the copending international patent application WO 02/09264 A1, from the same applicant.

One of the components widely used in starting "split-phase" single-phase motors, where an operating capacitor is not used, is the electromechanical relay type. Its extensive use is related to its low manufacturing cost and its technological simplicity. On the other hand, the electromechanical relay presents a number of limitations chief among which are the need for the design of a specific component for each size of electric motor, the impossibility of its use in high efficiency engines where an operating capacitor is used, the generation of electromagnetic noise and sounds during its operation and the wearing of components caused by electric arcing and mechanical friction.

An alternative to the electromechanical relay is the PTC-type ("Positive Temperature Coefficient") device. This component is widely used in high efficiency engines where its application is associated with an operating capacitor. As it involves the use of a ceramic chip with no moving parts, its principle resolves many of the limitations of the electromechanical relay. As its operation is based on the heating of a ceramic chip, resulting in its increased resistance and the consequent limitation of circulating current, dissipation of residual power occurs over the entire period of its operation.

Another limitation of this component is related to the time interval required between consecutive starts. One of its major advantages is the possibility of using a single component to operate the start of a set of motors of a specified voltage (115V or 220V), but becomes a limitation when the feature under consideration is optimization of the energization time of the secondary winding. Its conduction time is directly proportional to the volume of the ceramic chip and inversely proportional to the circulating current, resulting in a reduced starting time when applied to larger motors and too long a period of time when applied to smaller motors. These two facts result in a deficient starting of larger motors and higher energy consumption during the starting period in smaller motors.

While timed starting components eliminate the major drawback of residual consumption of the PTC, they, however, do not allow one to adapt the starting time required for motors of different sizes. Its concept does not allow for the sizing of a circuit which provides the optimal starting time for different motor sizes, and it becomes necessary to have several models, each of them set to a given operating time and to suit a particular family of electric motors, resulting in de-standardization, increased changes in manufacturing lines and higher inventory. Such devices do not take into account the operating conditions at the moment of start-up and are therefore sized for the worst condition, thus increasing starting time.

In view of the above, the present invention offers a new method of starting single-phase motors capable of optimizing the starting time of a wide range of motors, especially in terms of their operating power. Furthermore, a device and a starting system are also provided in order to achieve the objects of the present invention.

OBJECTS OF THE INVENTION

It is a first object of the present invention to provide a cost-effective starting device with a simple and robust topology, which allows for:

i) large-scale use in low-cost systems, offering the advantages of timed devices in which residual power consumption is eliminated;

ii) the reduction of the number of components necessary for treating with a specific family of motors of the same supply voltage;

iii) the use of high-efficiency motors with operating capacitors, and that presents the feature of electromechanical relays, in which starting time is optimized in each different size of electric motor.

It is a second object of the present invention to provide a starting method for single-stroke induction motors that optimizes starting time in function of the size and motor load associated with the same.

It is another object of the present invention to provide a starting method for single-stroke induction motors that automatically optimizes starting time relative to the supply network voltage.

An additional object of the present invention is to provide an electronic device for starting a single-phase induction motor with negligible power consumption.

Furthermore, it is an objective of this invention to provide an electronic device for starting a single-phase induction motor that can operate in conjunction with a starting capacitor or any other impedance installed in series with the starting winding of the motor.

The present invention further aims to provide an electronic device for starting a single-phase induction motor that is not susceptible to transients or disturbances emanating from the supply network.

Finally, it is an objective of the present invention to provide an electronic device for starting single-phase induction motors that can operate in conjunction with the arrangement of some refrigeration systems having an impedance (resistance) connected in parallel with thermostat contacts used to generate a small amount of heat to keep the thermostat contacts free of moisture, but that also induce the appearance of residual voltages on the compressor terminals which disrupt or prevent the operation of some types of electronic devices that may erroneously construe such residual voltages as a functioning state of the compressor.

BRIEF DESCRIPTION OF THE INVENTION

The objects of the present invention are achieved by the provision of a method for starting a single-phase induction motor, the motor comprising a rotor and a stator having a running winding and a starting winding, the starting winding being linked electrically to the starting device, the starting device and running winding being linked electrically to a source of alternate voltage supply, the method comprising the following steps:

a-) measuring at a first moment, via the starting device, one or more source time periods Tfon, in which an alternate voltage signal supplied by the source of alternate voltage F crosses zero;

b-) creating an internal timebase Tref in the starting device, via two periods of time measured in Step a;

c-) closing the starting switch S1 in a second instance of power supply T2 to the single-phase motor, starting the supply of current to the starting winding B2 of the motor;

d-) measuring one or more starting time periods Tpar from the current of the starting winding B2 when this crosses zero;

e-) comparing Tpar starting time periods where the current flowing through the starting winding B2 crosses zero with an internal timebase Tref;

f-) calculating via the starting device, a phase difference Df between the current flowing through the starting winding B2 and the internal base time Tref starting from the comparison made in Step e;

g-) opening the starting switch S1 based on the calculation of Step g, starting when the device detects a phase difference Df between the current flowing through the starting winding B2 and the internal timebase Tref, of a value greater than a pre-determined starting phase boundary Lfap.

The objectives of the present invention are also achieved by the provision of a device for starting a single-phase induction motor, such that this device comprises a start switch and at least one source of direct current linked electrically and in parallel to each another, at least one signal-processing electronic device electrically powered by the direct current source, the electronic signal processor device being electrically and operatively linked to the starting switch through a control terminal, at least one voltage zero-crossing sensor electrically linked to the electronic signal processing device and to the starter, at least one voltage zero-crossing sensor linked electrically to the electronic signal-processing device and to the start switch, the starting device being configured to promote the starting and/or stopping of the single-phase induction motor by the start switch.

Finally, the objectives of this invention are achieved by providing a system for starting a single-phase induction motor, the motor comprising a rotor and a stator having a running winding and a starting winding, the system comprising:

a start switch linked electrically via its contact terminals to a source of alternate voltage, the start switch being configured to electrically connect a first terminal of the starting winding to alternate voltage source;

a DC power source supplied from the contact terminals of the start switch;

an electronic signal-processing device fed by the direct current source and operatively linked to the start switch;

a zero-crossing sensor for starting winding current configured to detect time periods or instances in which the starting winding current crosses zero;

a zero-crossing sensor of voltage in the terminals of the start switch configured to detect periods of time, or instances, in which the voltage between the start switch terminals crosses zero;

the system being configured to close the start switch in such a way as to initiate the supply of current to the motor's starting winding; and the system being configured to open the start switch upon detection of a phase difference between the current circulating in the starting winding and the internal timebase.

BRIEF DESCRIPTION OF THE DRAWINGS

The present invention will be hereinafter described with reference to a preferred embodiment illustrated in the accompanying drawings of which.

DETAILED DESCRIPTION OF THE DRAWINGS

Figure 1:
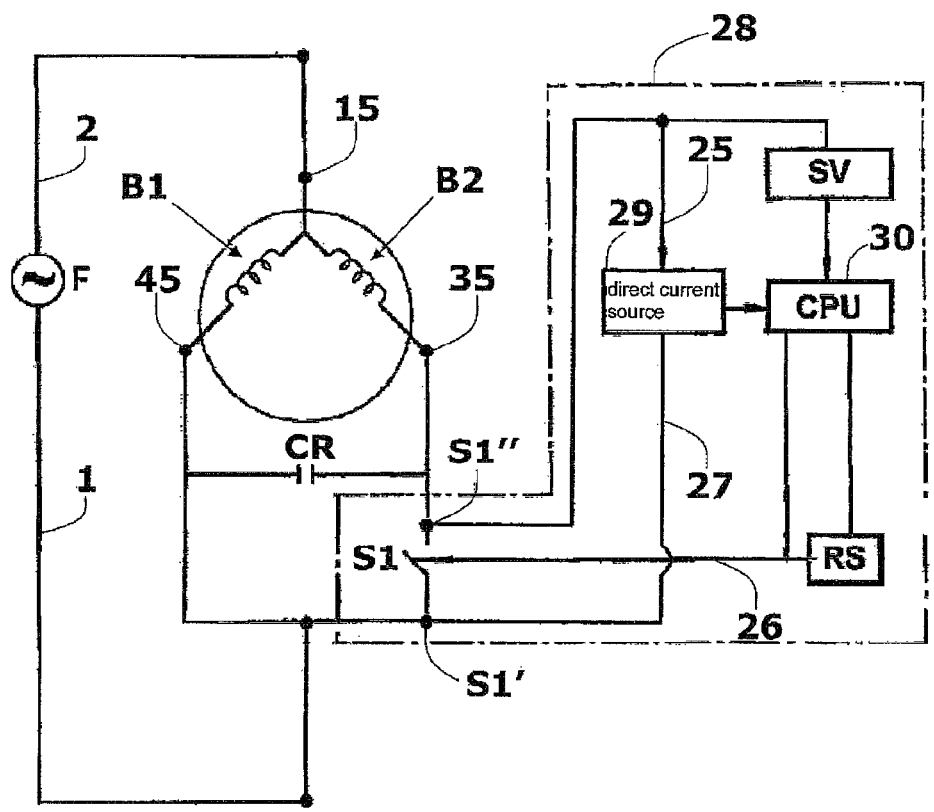
FIG. 1—shows a schematic diagram of a preferred embodiment of the electronic starting device and system, the object of the present invention.

FIG. 1 illustrates a preferred embodiment of the object of the invention herein.

More particularly, the present invention provides a starting device 28 for a single-phase induction motor configured to provide means for ignition and shutdown of said motor in a very efficient and simplified manner.

This device 28 is essentially comprised of a start switch S1 and at least one direct current source 29 electrically linked in parallel to each other, as can be seen in FIG. 1. Preferably, it is proposed to fit a single direct current source 29, however, one or more sources can be installed so as to supply the components and/or functional modules of device 28, which will be discussed in more detail below.

Said device 28 further comprises at least one electronic signal-processing device 30 powered electrically by the direct current source 29, and this device 30 is operably linked to the start switch S1 via a control terminal 26. Most preferably, the starting device 28 includes only one electronic signal-processing device 30 such as a micro-processor or micro-controller, however, two or more may be used without affecting the functioning and operation of this starter 28.

Some conventional components that are now well-known, such as micro-controllers from the Microchip family, ICPs or old micro-controllers from the INTEL family such as the 8051 and 8052, among others, can be easily used to build the electronic signal-processing device 30 in the present invention. Otherwise, this device 30 can also be made by a dedicated electronic circuit and designed from electronic components in general use.

Additionally, FIG. 1 shows that the starting device 28 further comprises at least one voltage zero-crossing sensor SV electrically linked to the electronic signal-processing device 30 and to the start switch S1, and at least one voltage zero-crossing sensor RS electrically linked to the electronic signal-processing device 30 and to the start switch S1.

The starting device 28, in accordance with the teachings of the present invention, is configured to promote the starting and/or shutdown of the single-phase induction motor via the start switch S1.

In more detail, as can be seen in FIG. 1, the starting device 28 connects through its start switch S1, the starting winding B2 to an alternate voltage source F. After motor start-up, the start switch S1 is brought into an open position by device 28.

An innovative feature of the present invention relates to the methodology, or method, of driving and control of motor start-up. Such a motor comprises a rotor and a stator M having a running winding B1 and a starting winding B2, as illustrated in FIG. 1. From FIG. 1 it can also be noted that the starting winding B2 is electrically linked to the aforementioned starting device 28, so that the running winding B1 is electrically linked to a source of alternate voltage supply F, or simply an alternate voltage source F.

More broadly, the present method is described below based on its main steps, namely:

a-) firstly measuring via starting device 28, one or more source time periods Tfon in which an alternate voltage signal supplied by the alternate voltage source F crosses zero;

b-) creating an internal timebase Tref in the starting device 28, with the said base Tref synchronized with a phase of the voltage signal of the alternate voltage source F, over the periods of time measured in Step a;

c-) closing the start switch S1 in a second supply period or instance T2 of the single-phase motor, initiating the supply of current to the starting winding B2 of the motor;

d-) measuring one or more starting time periods Tpar of the voltage of the starting winding B2 where the latter crosses zero;

e-) comparing the times where the current flowing through the starting winding B2 crosses zero with the internal timebase Tref;

f-) calculating, via the starting device 28, the phase difference Df between the current flowing through the starting winding B2 and the internal timebase Tref based on the comparison made in Step e;

i-) opening the start switch S1 based on the calculation in Step g when the starting device 28 detects a phase difference Df between the current flowing through the starting winding B2 and the internal timebase Tref of a value in excess of a predetermined start phase boundary Lfap.

Figure 2:
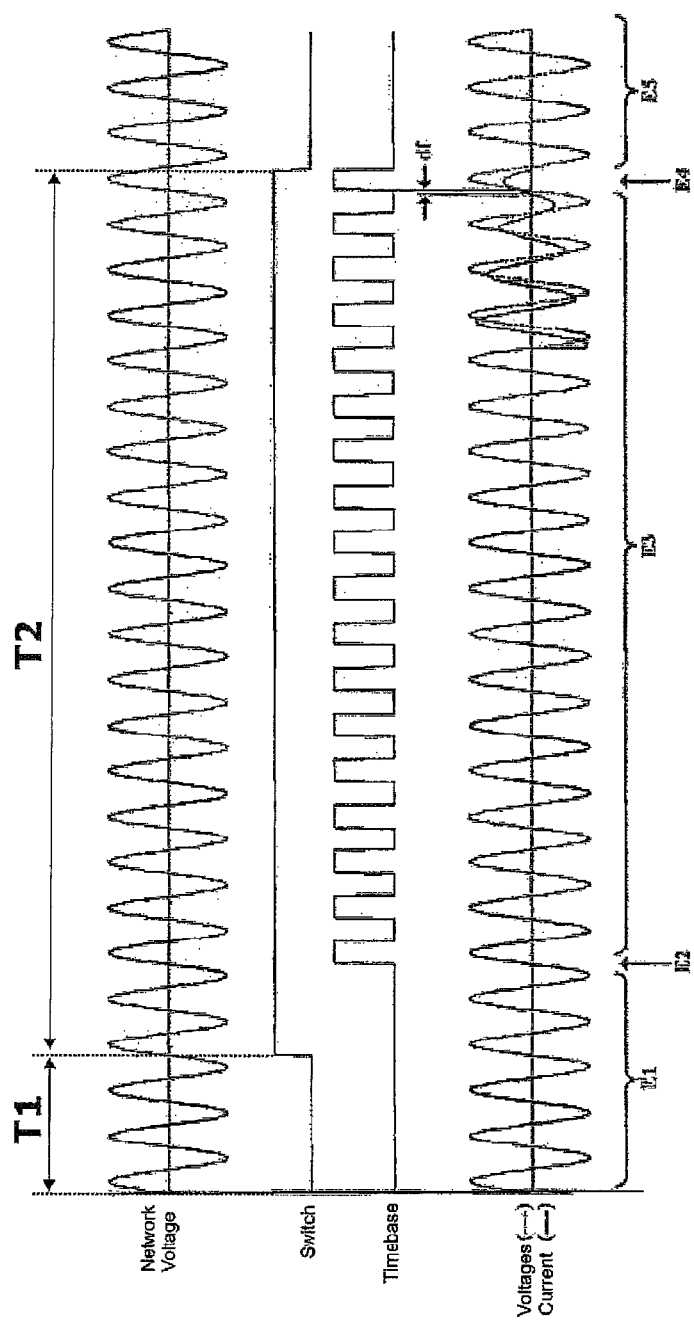
FIG. 2—shows a graph illustrating the voltage waveform of the electronic starting device, in accordance with the teachings of the present invention.

FIG. 2 shows the voltage waveform present in the starting device 28, allowing for the identification of the critical moments of the start-up of the single-phase induction motor, according to the teachings of the present invention.

It is worth to note that in this case, the predetermined phase boundary Lfap depicts an operating state in which the motor is accelerated with a rotational speed close to its nominal operating speed. It is a fact that Step "d" above corresponds to the point at which the motor is initiating its start-up.

On the other hand, the phase boundary Lfap, as described, corresponds to the point at which the motor reaches substantially higher rotational speeds as compared to the beginning of the machine's start-up. When the electric motor is at a low speed or stopped, for example, the phase difference Df between the current flowing in the starting winding B2 and the calculated internal timebase calculated is considerably small in the present invention.

Operationally, to recap, we see that opening the start switch S1 is effected through a command sent by the electronic signal-processing device 30, which is incorporated in the starting device 28, as shown in FIG. 1, at the moment when the motor is accelerated with a rotational speed close to its nominal value.

Alternatively, the present method further comprises a step of opening the start switch S1 when the phase difference Df between the current flowing through the starting winding B2 and the internal timebase Tref is larger than a predetermined phase value Fpred, which is configured to represent a state in which the motor is accelerated to a speed close to its nominal speed, after the expiry of a preset starting time starting Tppre.

Expressed in another way, the operational methodology of the object claimed herein also provides a step of opening the start switch S1 when the phase difference Df between the current flowing through the starting winding B2 and the internal timebase Tref presents null variation, this condition being set to represent a state of operation where the motor has completed its acceleration.

Thus, the electronic signal-processing device 30 via the control terminal 26 issues a command to the start switch S1 to open and remain in this state, terminating the supply of current to the starting winding B2, and therefore the motor start.

In the present invention there is further provided a step (j) to keep the start switch S1 open until the alternate voltage source signal F, or the power supplied is stopped over a stoppage period Tpara sufficient to characterize the stoppage of the motor.

Furthermore, the present method also comprises the step after motor start-up, to analyze time periods, or instances, in which the zero-crossing occurs at a voltage Vpar on the start switch S1. Thus, the start switch S1 is held closed during the start of the motor and open over the entire time that the motor is operating, so that the electronic signal-processing device 30 records voltage zero-crossing instances on said start switch S1 through a source terminal 25 and a voltage zero-crossing sensor SV capable of detecting the motor's operating state and recognizing its deceleration or shut-down through the interruption of power supplied by alternate voltage supply source F.

Figure 3:
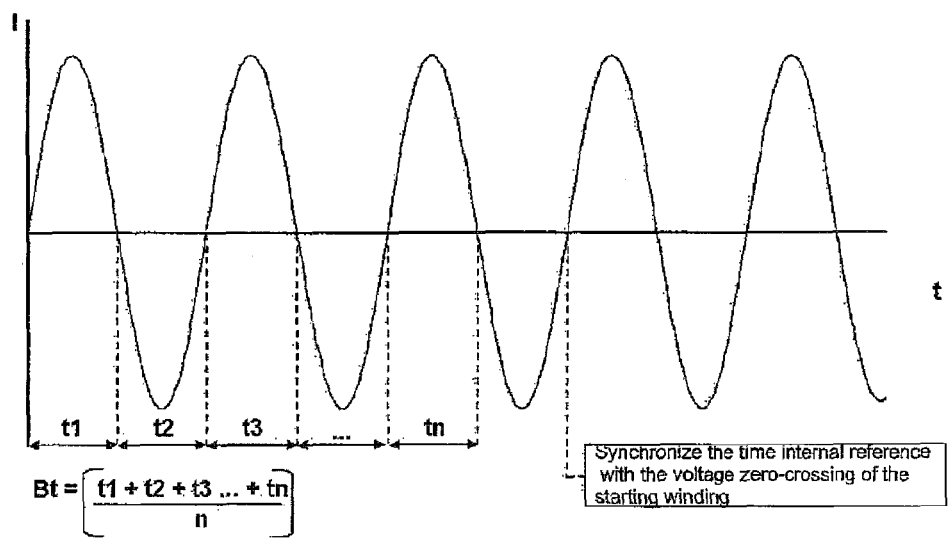
FIG. 3—shows a graph illustrating the timebase setting performed by the control unit of the starting device.

The method proposed herein also provides the steps for storing the internal timebase Tref, and synchronizing it with the voltage zero-crossing of starting winding B2. FIG. 3 shows a graph where it is possible to display the setting of the timebase carried by the electronic signal-processing device 30, in accordance with the object of the present invention.

In relation to the aforementioned, it is noteworthy that with each new motor start-up a new timebase, or reference point, is created and stored by the electronic device 30 so that the circuit automatically adapts to new system load conditions, in particular supply voltage (overvoltage or undervoltage) and temperature conditions of the running winding B1 and the starting winding 32 of the stator.

Due to the record created for each new start cycle, the circuit does not require any prior calibration to operate with a given type of motor, as currently occurs in other prior art solutions, thus facilitating its use in a wide range of motors.

In the event of an unsuccessful attempt at start-up or ignition in which the rotor remains locked and there is no change in phase difference Df, the electronic signal-processing device 30 instructs the opening of start switch S1, when the time from the closing of start switch S1 exceeds a predetermined maximum time value for completion of motor start-up. In this condition, the time interval E1 shown in FIG. 2 will extend unduly, reaching a maximum allowable time and the opening of the start switch S1 will protect the start switch itself.

Therefore, based on the above, the present method provides a step capable of determining the opening of start-switch S1, through the starting device 28, when a time counted from the closing of start switch S1, exceeds a preset maximum time-value Tmax for completion of motor start-up.

In this case, the circuit will delay for a period appropriate for the cooling of the motor and/or required to adjust the load condition to the torque supplied by the motor, before allowing a new start cycle. In order to complete this last operation, the proposed method provides a step relating to the delay for the cooling of the motor Tres, and/or minimum load time Tmin, required establishing the load condition to the torque provided by the motor before allowing a new start cycle.

Finally, the instant invention provides a system for starting a single-phase induction motor, this motor being having a rotor and a stator M. The stator comprises a running winding B1 and a starting winding B2 as mentioned above.

In greater detail, and as illustrated in FIG. 1, it is noted that this system comprises a start switch S1 linked electrically through its contact terminals to an alternate voltage source F. Said start switch S1 is configured to electrically connect a first terminal of the starting winding B2 to alternate voltage source F.

In the same FIG. 1 one can observe in the system herein proposed the presence of a direct current source 29 supplied from the contact terminals of the start switch S1.

In this system there is also provision, as mentioned earlier, for at least one electronic signal processor 30, fed by direct current source 29, and operably linked to the start switch S1.

Additionally, a voltage zero-crossing sensor RS of the starting winding B2 is provided in the current starting system, configured to detect periods of time or instances in which the current in the starting winding B2 crosses zero. A voltage zero-crossing sensor SV connected to the terminals of the start switch S1 is also provided in this system, this sensor being configured to detect periods of time or moments in which the voltage between the terminals of the start switch S1 crosses zero.

In a very efficient and functional manner, the starting system, the object of the present invention, is configured to close the start switch S1 in order to start the supply of current to the starting winding B2 of the motor when starting the engine. In a very innovative manner with regards to the solutions available today, the aforementioned system is further configured to open the start switch S1 from a detected phase difference Df between the current circulating in the starting winding B2 and the internal time base Tref.

The opening of the starter S1 is established when the phase difference Df calculated above is greater than a predetermined phase limit Lfase.

From the configuration for the starting system of the present invention, it can be stated that the start switch S1, direct current source 29, electronic signal-processing device 30 and the voltage zero-crossing sensor RS and the voltage zero-crossing sensor SV form, in combination, a starting device 28.

FIG. 1 also shows that a first terminal of AC voltage supply source F is electrically linked to a first gear terminal 45 of the running winding B1 and a first switch terminal S1' of the start switch S1. The first source terminal 1 is also associated to a first direct source terminal 27 of the direct current source 29.

Still in FIG. 1, one can see that a second direct current source terminal 25 is electrically linked to a second terminal switch S1" of the start switch S1.

Regarding the control of said start switch S1, it is noted that this is operably linked to the electronic signal-processing device 30 via a control terminal 26 of the start switch S1.

In its operational form, the present system employs, as illustrated in FIGS. 2 and 3, the electronic signal-processing device 30 so as to create an internal time base Tref by the so-called starting device 28, with this timebase Tref being synchronized with a signal voltage phase of the alternate voltage source F.

In this regard, the electronic signal-processing device 30 determines the moments of opening and closing of the start switch S1 based on a calculated phase difference Df between the phase of current flowing through the starting winding B2 and the internal timebase Tref.

Furthermore, the electronic signal-processing device 30 is configured to keep the start switch S1 open until the power supplied by alternating current source F is interrupted for a period of time which features the motor stoppage.

FIG. 1 further illustrates that the present system provides for the use of an operation capacitor CR positioned parallel to the terminals of the running winding B1 and starting winding B2 of the stator M in such a way as to provide a phase difference between the currents that pass through the running winding B1 and the starting winding B2.

Finally, the present invention achieves its objects in that it provides a starting mechanism, comprising a system, method and device for starting a single-phase motor, that is substantially more efficient and simplified compared to solutions known as the state of the art, as well as being capable of offering a more optimized start for a wide power range of motors of that type.

Having described an example of its preferred embodiment, it must be understood that the scope of the present invention includes other possible variations, being limited only by the content of the claims, which include therein possible equivalents.

The invention claimed is:

1. A method for starting a single-phase induction motor, the motor comprising a rotor and a stator (M) with a running winding (B1) and a starting winding (B2), the running winding (B1) and the starting winding (B2) being connected in parallel to an alternate voltage power supply (F), the starting winding (B2) being electrically linked with a starting device (28), the starting device comprising a start switch (S1) allowing connecting and disconnecting the starting winding (B2) to/from the voltage power supply (F) under the control of an electronic signal-processing device (30), the starting device (28) comprising a source of direct current (29) supplied from the terminals of the start switch (S1), the starting method comprising the steps of:
   a-) measuring via the starting device (28), the voltage between the terminals of the start switch (S1) and computing and storing an internal timebase (Tref) by the electronic signal processing device (30) based on a plurality of detected time instants (Tpar) when this voltage crosses zero before closing the start switch (S1), the internal timebase (Tref) being synchronized with the phase of the voltage power source (F),
   b-) closing the start switch (S1), for initiating the supply of current to the starting winding (B2) of the motor;
   c-) measuring one or more starting time instants (Tpar) of the current in the starting winding (B2) where this crosses zero;
   d-) comparing the time instants (Tpar) where the current flowing through the starting winding (B2) crosses zero with the internal timebase (Tref);
   e-) calculating, via the starting device (28), a phase difference Df between the current flowing through the starting winding (B2) and the internal timebase (Tref) based on the comparison made in Step d;
   f-) opening the start switch (S1) based on the calculation in Step e when the starting device (28) detects the phase difference (Df) between the current flowing through the starting winding (B2) and the internal timebase (Tref) of a value in excess of a predetermined start phase boundary.

2. The method as set forth in claim 1, wherein the predetermined starting phase boundary depicts an operating state in which the motor is accelerated at a rotational speed close to its nominal operating speed.

3. The method as set forth in claim 2, wherein the opening of the start switch (S1) occurs from a command sent via the electronic signal-processing device (30), which is contained within the starting device (28), at the moment when the motor is accelerated at a rotational speed close to the nominal speed.

4. The method as set forth in claim 1, further comprising a step:
   g) opening the start switch (S1) when the phase difference (Df) between the current flowing through the starting winding (B2) and the internal timebase (Tref) is greater than a predetermined phase value, which is configured to represent a state in which the motor is accelerated to a rotational speed close to its nominal speed after the expiry of a predefined starting time.

5. The method as set forth in claim 1, further comprising a step:
   h) opening the start switch (S1) when the phase difference (Df) between the current flowing through the starting winding (B2) and the internal time base (Tref) shows no change, this condition being configured to represent an operation in which the motor has completed its acceleration.

6. The method as set forth in claim 1, further comprises the step of:
   i) keeping the start switch open until the signal voltage of the alternate voltage source (F) is interrupted for a period of time of stoppage sufficient to features a stoppage of the motor.

7. The method as set forth in claim 1, further comprising the step of analyzing, after motor startup, the time instants or moments in which voltage zero-crossing occurs above the start switch (S1).

8. The method as set forth in claim 1, further comprising the steps of:
   storing the internal timebase (Tref); and
   synchronizing the time internal reference (Tref) with the voltage zero-crossing of the starting winding (B2).

9. The method as set forth in claim 1, further comprising the step of:
   determining the opening of the start switch (S1) via the starting device (28) where a duration counted from the closing of the start switch (S1) exceeds a maximum time value (Tmax) previously defined for the completion of motor start-up.

10. The method as set forth in claim 9, further comprising a step of waiting some time for the cooling of the motor (Tres), and/or a minimum load time (Tmin) configured to establish the load condition to the torque supplied by the motor, before beginning a new starting cycle.

11. A starting device for a single-phase induction motor (28), the single-phase induction motor (28) comprising a running winding (B1) and a starting winding (B2) connected in parallel to an voltage power supply (F), the starting device comprising:
   a start switch (S1) allowing connecting and disconnecting the starting winding (B2) to/from the voltage power source (F) under the control of at least one electronic signal-processing device (30), wherein:
   the start switch (S1) and at least one source of direct current (29) are linked electrically and in parallel to each other,
   the electronic signal-processing device (30) is supplied electrically by the direct current source (29), the electronic signal-processing device (30) being electrically and operatively linked to the start switch (S1) via a control terminal (26),
   at least one voltage zero-crossing sensor (SV) is linked electrically to the electronic signal-processing device (30) and the start switch (S1),
   at least one zero-crossing sensor (RS) is electrically linked to the electronic signal-processing device (30) and the start switch (S1),
   the starting device is configured to promote the starting and/or stopping of the single-phase induction motor via the start switch (S1), and the starting device is also configured in such a way that the voltage between the terminals of the start switch (S1) is measured and an internal timebase (Tref) is computed and stored by the electronic signal processing device (30) based on a plurality of detected time instants (Tpar) when this voltage crosses zero before closing the start switch (S1), the internal timebase (Tref) being synchronized with the phase of the voltage power supply (F), the starting device also configured in such a way that the start switch (S1) is opened when the phase shift between the current through the starting winding (B2) and the internal timebase (Tref) is detected to exceed a predetermined value.

12. A system for starting a single-phase induction motor, the motor comprising a rotor and a stator (M) with a running winding (B1) and a starting winding (B2), the running winding (B1) and the starting winding (B2) being connected in parallel to an alternate voltage power supply (F), the system comprising:
- a start switch (S1) associated electrically via its contact terminals to the source of alternate voltage (F), the start switch (S1) allowing connecting and disconnecting the starting winding to/from the alternate voltage power supply (F) under the control of an electronic signal-processing device (30);
- a source of direct current (29) supplied by the contact terminals of the start switch (S1);
- the electronic signal-processing device (30), supplied by the direct current source (29) and operably linked to the start switch (S1);
- a current zero-crossing sensor (RS) configured to detect periods of time or time instants in which the current of the starting winding (B2) crosses zero; and
- a voltage zero-crossing sensor (VS) at the terminals of the start switch (S1) configured to detect periods of time or time instants in which the voltage between the terminals of the start switch (S1) crosses zero;
- the system being configured that the voltage between the terminals of the start switch (S1) is measured and an internal timebase (Tref) is computed and stored by the electronic signal processing device (30) based on a plurality of detected time instants (Tpar) when this voltage crosses zero before closing the start switch (S1), the internal timebase (Tref) being synchronized with the phase of the alternate voltage power supply (F);
- the system being configured to close the start switch (S1) in order to initiate supply of current to the starting winding (B2) of the motor;
- the system being configured to open the start switch (S1) at the detection of a phase difference (Df) between the current flowing in the starting winding (B2) and the internal timebase (Tref) of a value in excess of a predetermined start phase boundary.

13. The starting system as set forth in claim 12, wherein the opening of the start switch (S1) is established when the phase difference (Df) calculated is over a predetermined phase limit (Lfase).

14. The starting system as set forth in claim 12, wherein the start switch (S1), the source of direct current supply (29), the electronic signal-processing device (30) of the current zero-crossing sensor (RS), and a voltage zero-crossing sensor (SV) form, in combination, a starting device (28).

15. The starting system as set forth in claim 12, wherein a first supply terminal (1) of the alternate voltage supply source (F) is linked electrically to a first gear terminal (45) of the running winding (B1) and a first switch terminal (S1') of the start switch (S1).

16. The starting system as set forth in claim 15, wherein the first supply terminal (1) is linked to a first direct current terminal (27) of the direct current source (29).

17. The starting system as set forth in claim 12, wherein the electronic signal-processing device (30) is operably linked to the start switch (S1) through a control terminal (26) of the start switch (S1).

18. The starting system as set forth in claim 14, wherein the electronic signal-processing device (30) creates an internal time base (Tref) through the starting device (28), and this reference time is synchronized with an alternate voltage signal phase of the AC power source (F).

19. The starting system as set forth in claim 12, wherein the electronic signal-processing device (30) determines the moment of opening and closing of the start switch (S1) based on a phase difference (Df) calculated between the phase of current flowing through the starting winding (B2) and the voltage phase in the alternate voltage source (F).

20. The starting system as set forth in claim 12, wherein the electronic signal-processing device (30) is configured to maintain the start switch (S1) in the open state until the power supplied by the alternate voltage source (F) is interrupted for a period of time which features motor stoppage.

21. The starting system as set forth in claim 12, further comprising an operating capacitor (CR) arranged parallel to the terminals of the running winding (B1) and the starting winding (B2) of the stator (M), so as to provide a phase difference between the currents passing through the running (B1) and starting (B2) windings.

* * * * *